United States Patent
Fujii (10) Patent No.: US 12,092,264 B2
(45) Date of Patent: Sep. 17, 2024

(54) TANK HOLDING DEVICE

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 64 days.

(21) Appl. No.: 17/808,618

(22) Filed: Jun. 24, 2022

(65) Prior Publication Data
US 2023/0003342 A1 Jan. 5, 2023

(30) Foreign Application Priority Data

Jun. 30, 2021 (JP) .................................. 2021-108509

(51) Int. Cl.
*F17C 13/08* (2006.01)
*F17C 1/06* (2006.01)
(Continued)

(52) U.S. Cl.
CPC .............. *F17C 1/06* (2013.01); *F17C 13/084* (2013.01); *B60K 15/067* (2013.01); *B60K 15/07* (2013.01);
(Continued)

(58) Field of Classification Search
CPC ........ F17C 2201/0109; F17C 2203/012; F17C 2205/0153; F17C 2221/012; F17C 2270/0168; F17C 2205/03; F17C 2205/037; F17C 2205/0302; F17C 2205/0305; F17C 2209/234; F17C 13/084; F02M 21/029; F02M 21/0221; F02M 21/0296;
(Continued)

(56) References Cited

U.S. PATENT DOCUMENTS 1,607,943 A * 11/1926 Carson .................... F16L 17/04
277/614
2,426,423 A * 8/1947 Woolsey ................. F16L 17/04
403/222
(Continued)

FOREIGN PATENT DOCUMENTS

JP 2016070467 A 5/2016
JP 2021195964 A 12/2021

OTHER PUBLICATIONS

Notice of Allowance, USPTO, issued in U.S. Appl. No. 17/662,562 on Nov. 9, 2023, 8 pages.
(Continued)

*Primary Examiner* — Craig J Price
(74) *Attorney, Agent, or Firm* — Hunton Andrews Kurth LLP (57) ABSTRACT

A tank holding device includes a band configured to tighten a hydrogen tank. The band includes a band-shaped base portion extending along an outer circumference of the hydrogen tank, and a plurality of pressing portions projecting from both sides of the base portion in a width direction orthogonal to a longitudinal direction of the base portion and configured to apply a pressing force to an outer peripheral surface of the hydrogen tank by elastically deforming in abutment against the outer peripheral surface of the hydrogen tank. At least an elastic member is provided in a gap between the band and the hydrogen tank to fill the gap.

6 Claims, 8 Drawing Sheets

(51) Int. Cl.
*B60K 15/067* (2006.01)
*B60K 15/07* (2006.01)

(52) U.S. Cl.
CPC ............... *F17C 2201/0109* (2013.01); *F17C 2203/012* (2013.01); *F17C 2205/0153* (2013.01); *F17C 2221/012* (2013.01); *F17C 2270/0168* (2013.01)

(58) Field of Classification Search
CPC ... F16B 2/08; B60K 15/07; B60K 2015/0638; B60K 15/067; B60K 2015/0675; Y02T 10/30; Y02E 60/32; F16J 13/065; Y10T 24/1457–1498
USPC ............... 137/581, 899, 899.4, 206–214; 292/256.65; 220/581, 325, 686, 638, 220/615; 248/316.6, 309.1, 313, 316.8; 285/365
See application file for complete search history.

(56) References Cited

U.S. PATENT DOCUMENTS

| | | | | |
|---|---|---|---|---|
| 3,315,628 A * | 4/1967 | Gorman | ............... | B63B 25/16 220/560.12 |
| 4,155,529 A * | 5/1979 | Maudlin | ............... | F16M 5/00 416/500 |
| 4,185,858 A * | 1/1980 | Peash | ............... | F16L 23/18 277/626 |
| 4,219,125 A * | 8/1980 | Wiltshire | ............... | B65D 90/08 220/648 |
| 4,676,473 A * | 6/1987 | Giles | ............... | F16F 15/08 248/680 |
| 4,886,241 A * | 12/1989 | Davis | ............... | F16J 15/183 277/584 |
| 5,411,162 A * | 5/1995 | Koziczkowski | ............... | F16L 23/10 220/4.07 |
| 5,470,207 A * | 11/1995 | Shockey | ............... | F01C 21/007 417/313 |
| 5,810,309 A * | 9/1998 | Augustine | ............... | B60K 15/07 248/154 |
| 5,848,776 A * | 12/1998 | Craig | ............... | F16L 1/06 248/505 |
| 5,979,227 A * | 11/1999 | Lawson | ............... | G01M 3/185 73/40.5 R |
| 6,042,071 A * | 3/2000 | Watanabe | ............... | B60K 15/07 180/69.5 |
| 6,557,814 B1 * | 5/2003 | Rutz | ............... | F17C 13/084 248/505 |
| 6,840,556 B1 | 1/2005 | Catlett | | |
| 6,877,780 B2 * | 4/2005 | Potts | ............... | F16L 21/005 285/368 |
| 7,520,539 B2 * | 4/2009 | Ignaczak | ............... | F01N 13/1872 285/410 |
| 8,356,786 B2 * | 1/2013 | Guckes | ............... | B60K 15/07 220/325 |
| 9,618,147 B2 * | 4/2017 | Krueger | ............... | F16L 23/22 |
| 10,180,267 B2 * | 1/2019 | Bober | ............... | F24H 9/06 |
| 10,429,097 B1 * | 10/2019 | Sexton | ............... | F24H 1/188 |
| 2009/0309000 A1 | 12/2009 | Guckes | | |
| 2011/0272941 A1 * | 11/2011 | Broderick | ............... | F16L 27/073 285/337 |
| 2016/0039282 A1 | 2/2016 | Mathew | | |
| 2016/0097487 A1 | 4/2016 | Sasaki | | |
| 2018/0326842 A1 | 11/2018 | Sawada | | |
| 2021/0388948 A1 | 12/2021 | Fujii | | |
| 2023/0003348 A1 * | 1/2023 | Fujii | ............... | F17C 13/084 |

OTHER PUBLICATIONS

Office Action issued to U.S. Appl. No. 17/662,562 on Mar. 14, 2024, 12 pages.
USPTO Notice of Allowance issued to U.S. Appl. No. 17/662,562 on Jul. 1, 2024 (12 pages).

\* cited by examiner

TANK HOLDING DEVICE

CROSS-REFERENCE TO RELATED APPLICATION

This application claims priority to Japanese Patent Application No. 2021-108509 filed on Jun. 30, 2021, incorporated herein by reference in its entirety.

BACKGROUND

1. Technical Field

The present disclosure relates to a tank holding device.

2. Description of Related Art

For example, there is known a tank holding device described in Japanese Unexamined Patent Application Publication No. 2016-070467 (JP 2016-070467 A). In this tank holding device, a tank is placed in a support member having a recess for storing the tank, and is held by tightening the tank with bands from a side opposite to the support member for the tank. In this tank holding device, one end of the band is fixed to the support member with a bolt. The other end of the band is fixed to the support member while being urged by a coil spring. The band receives an urging force of the coil spring and is pressed against the outer peripheral surface of the tank.

SUMMARY

Recently, studies have been conducted to hold a tank by using a band having a leaf spring structure instead of the coil spring in order to reduce the size of the tank holding device. When holding the tank by using the band having the leaf spring structure, however, a gap is present between the band and the tank. When a solid foreign substance such as a pebble enters the gap, the stroke of the leaf spring (that is, deformation of the leaf spring) may be hindered. When a liquid foreign substance such as muddy water enters the gap, dry mud or icy mud may also hinder the stroke of the leaf spring. To suppress the entry of the foreign substance into the gap, for example, the entire band may be covered with a rubber cover. When the entire band is covered with the rubber cover, however, a large amount of rubber is required, which may lead to an increase in cost.

The present disclosure provides a tank holding device capable of suppressing entry of a foreign substance into a gap between a band and a tank.

A tank holding device according to one aspect of the present disclosure includes a band configured to tighten a tank. The band includes a band-shaped base portion extending along an outer circumference of the tank, and a plurality of pressing portions projecting from both sides of the base portion in a width direction orthogonal to a longitudinal direction of the base portion and configured to apply a pressing force to an outer peripheral surface of the tank by elastically deforming in abutment against the outer peripheral surface of the tank. At least an elastic member is provided in a gap between the band and the tank to fill the gap.

In the tank holding device according to the one aspect of the present disclosure, the elastic member is provided in the gap between the band and the tank to fill the gap. The elastic member can be used to suppress the entry of the foreign substance into the gap between the band and the tank. Since the elastic member fills the gap, it is possible to suppress influence of arrangement of the elastic member on the elastic deformation of the pressing portions.

In the tank holding device according to the present disclosure, the elastic member may be a closed cell foam. The closed cell foam has a property that liquid hardly enters the inside. Therefore, the closed cell foam can suppress not only a solid foreign substance but also a liquid foreign substance such as muddy water from entering the gap between the band and the tank.

In the tank holding device according to the present disclosure, the elastic member may be made of urethane. Urethane is relatively inexpensive and has high stretchability. By using urethane for the elastic member, it is possible to suppress the entry of the foreign substance into the gap between the band and the tank. By using urethane for the elastic member, it is possible to suppress the influence of the arrangement of the elastic member on the elastic deformation of the pressing portions. By using urethane for the elastic member, it is possible to suppress an increase in cost along with the arrangement of the elastic member.

In the tank holding device according to the present disclosure, the elastic member may be configured to limit deformation of the pressing portions to a specified amount. Even if a large stress is applied to the band due to vibration, impact, or the like, the deformation of the pressing portions to the specified amount can be limited by using the elastic member. Thus, it is possible to suppress irreversible deformation of the band.

In the tank holding device according to the present disclosure, a metal member or a hard resin member may be provided inside the elastic member. Thus, the deformation of the pressing portions to the specified amount can be limited by using the metal member or the hard resin member provided inside the elastic member. Even if a large stress is applied to the band due to vibration, impact, or the like, the deformation of the pressing portions to the specified amount can be limited by using the elastic member. Thus, it is possible to suppress the irreversible deformation of the band.

In the tank holding device according to the present disclosure, a slide plate may be interposed between each of the pressing portions and the outer peripheral surface of the tank.

In the tank holding device according to the present disclosure, the slide plate may include a body extending along the outer peripheral surface of the tank, and a left standing portion and a right standing portion standing at both ends of the body in the width direction orthogonal to the longitudinal direction.

According to the present disclosure, it is possible to suppress the entry of the foreign substance into the gap between the band and the tank.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, tank holding devices according to embodiments of the present disclosure will be described with reference to the drawings. In the description of the drawings, the same elements are represented by the same reference symbols, and duplicate description thereof will be omitted. In the following description, vertical and lateral directions are convenient directions related to, for example, a state shown in the drawings, and are not intended to limit the posture and arrangement of the tank holding device.

First Embodiment

Figure 1:
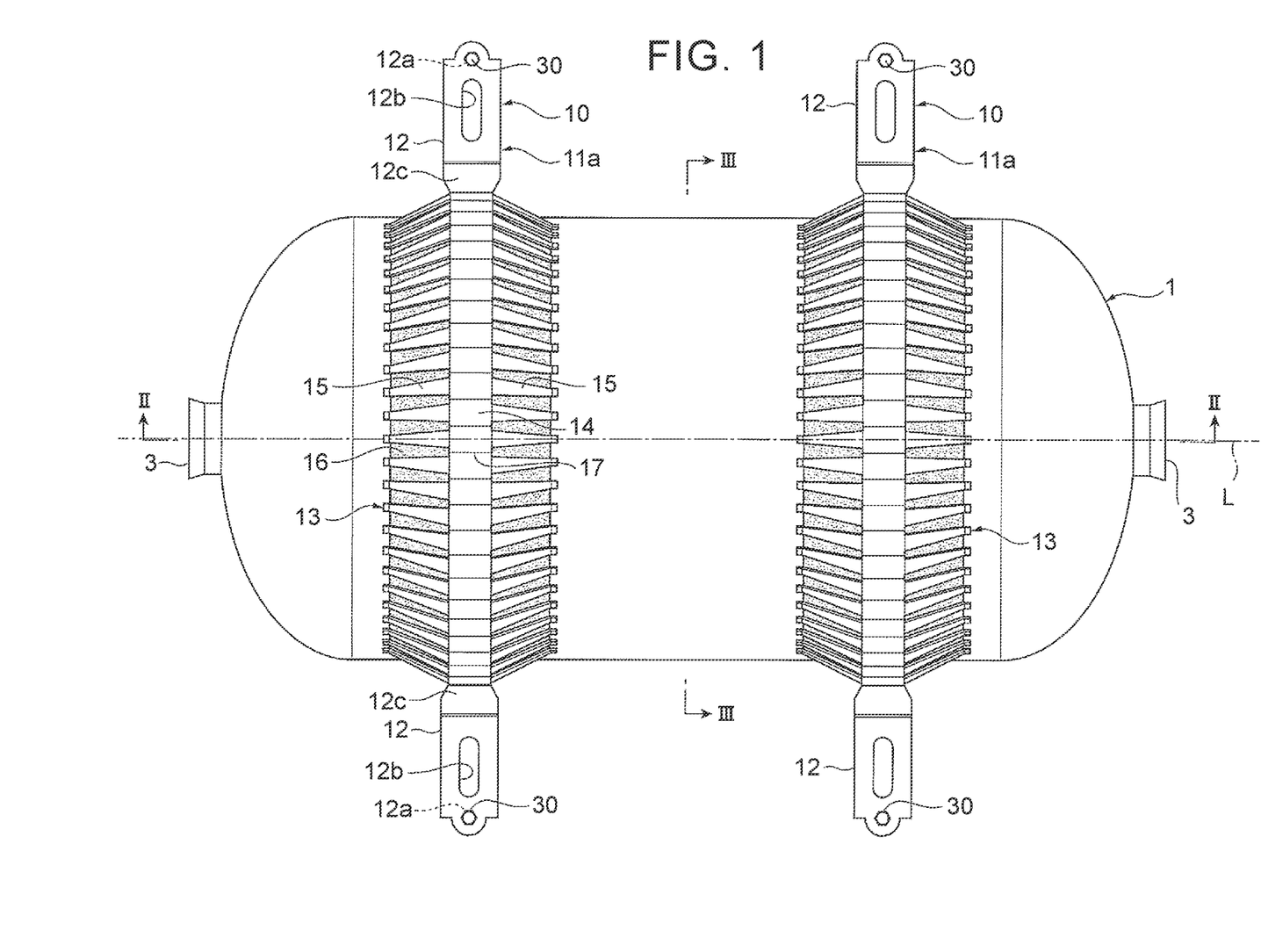
FIG. 1 is a plan showing a tank holding device according to a first embodiment.
Figure 2:
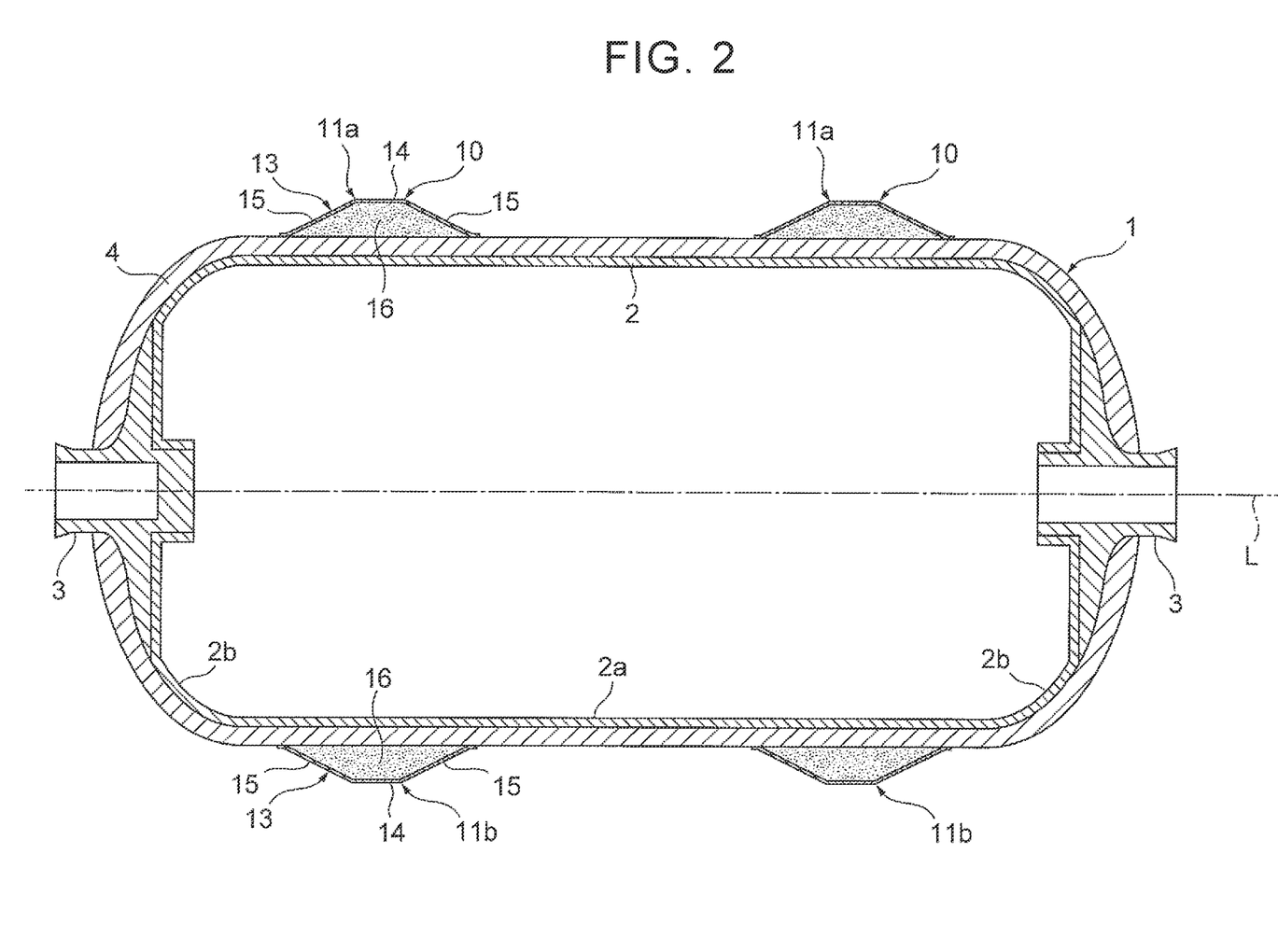
FIG. 2 is a sectional view taken along a line II-II in FIG. 1.
Figure 3:
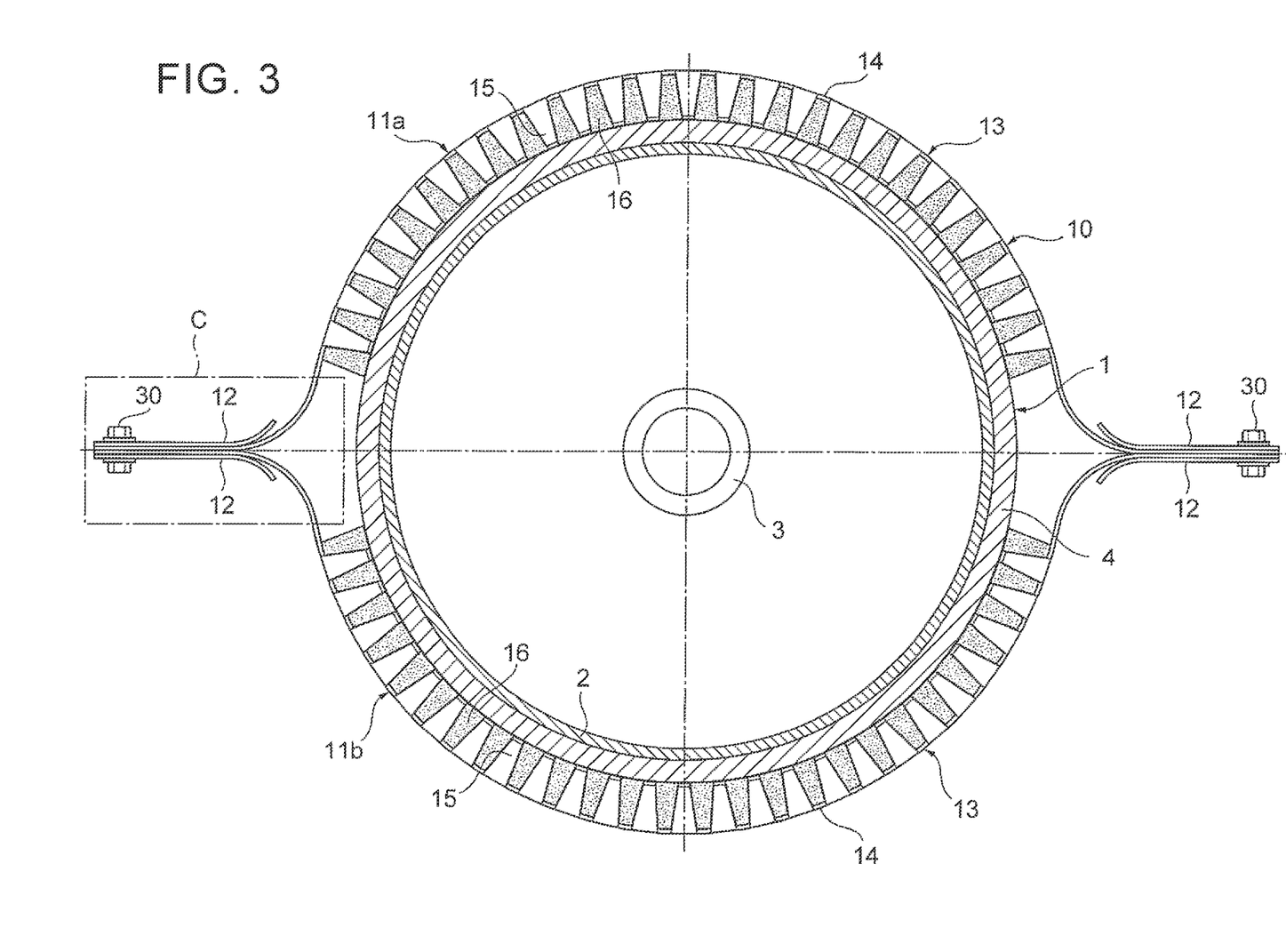
FIG. 3 is a sectional view taken along a line in FIG. 1.
Figure 4:
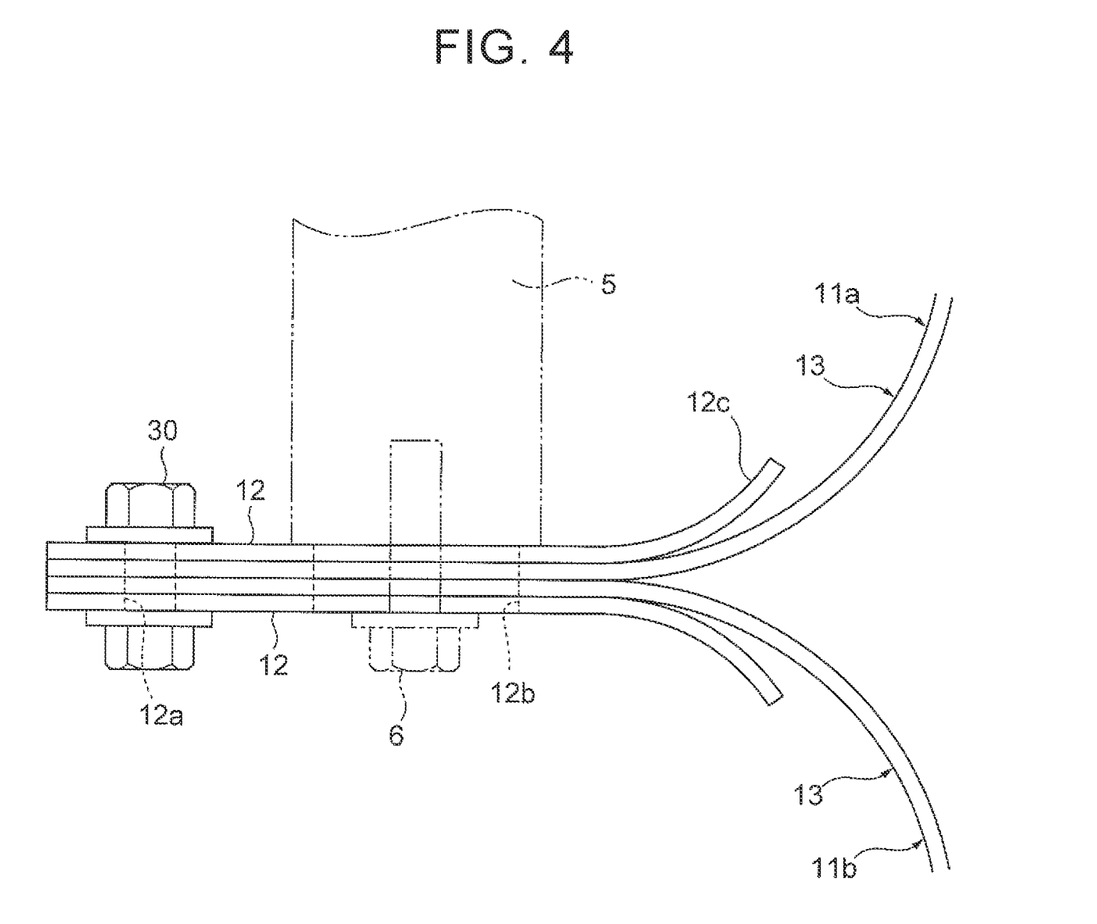
FIG. 4 is an enlarged view showing a portion C in FIG. 3.

FIG. 1 is a plan showing a tank holding device according to a first embodiment. FIG. 2 is a sectional view taken along a line II-II in FIG. 1. FIG. 3 is a sectional view taken along a line III-III in FIG. 1. FIG. 4 is an enlarged view showing a portion C in FIG. 3. In FIGS. 1 to 3, a tank held by the tank holding device is also shown to facilitate understanding of the structure of the tank holding device. A tank holding device 10 of the first embodiment is a device for holding, for example, a hydrogen tank 1 mounted on a fuel cell electric vehicle (not shown) and fixing the hydrogen tank 1 to the body of the fuel cell electric vehicle. Prior to description of the tank holding device 10, the structure of the hydrogen tank 1 will briefly be described.

Hydrogen Tank

As shown in FIG. 2, the hydrogen tank 1 is a substantially cylindrical container with both ends rounded in a dome shape. The hydrogen tank 1 includes a liner 2 having a storage space for storing high-pressure hydrogen, and a reinforcing layer 4 provided in close contact with the outer peripheral surface of the liner 2. The liner 2 includes a cylindrical body 2a and substantially hemispherical domes 2b provided at both right and left ends of the body 2a. Openings are formed at the top of the two domes 2b, and metal caps 3 are internally inserted into these openings.

The liner 2 is made of, for example, a resin material having a gas barrier property against hydrogen gas. Examples of the resin material include thermoplastic resins such as polyamide, polyethylene, ethylene-vinyl alcohol copolymer resin (EVOH), and polyester, and thermosetting resins such as epoxy. The cap 3 is made of a metal material such as aluminum. A member such as a valve is attached to the cap 3. The reinforcing layer 4 is formed, for example, such that fibers impregnated with a thermosetting resin are wound around the outer peripheral surface of the liner 2 by a plurality of turns. The fiber is made of a composite material in which, for example, carbon fiber, glass fiber, or aramid fiber is put in plastic to improve the strength.

The hydrogen tank 1 having such a structure is held by the tank holding device 10 at two points in a direction of an axis L of the hydrogen tank 1 (see FIGS. 1 and 2). The number of points where the hydrogen tank 1 is held by the tank holding device 10 is not limited to two, and may be, for example, three or more. When the tank holding device 10 and a neck mount member for fixing each cap 3 are used in combination, the hydrogen tank 1 may be held by the tank holding device 10 only at one point.

Tank Holding Device

The tank holding device 10 includes a pair of upper and lower holding members (first holding member 11a and second holding member 11b), and holds the hydrogen tank 1 by using these holding members. Specifically, the first holding member 11a is arranged on the upper half circumference of the hydrogen tank 1, and the second holding member 11b is arranged on the lower half circumference of the hydrogen tank 1. In this state, the ends of the first holding member 11a and the second holding member 11b are fastened to each other by fastening members 30. By tightening the hydrogen tank 1 between the first holding member 11a and the second holding member 11b in this way, the tank holding device 10 holds the hydrogen tank 1.

The first holding member 11a and the second holding member 11b have the same structure. Each of the first holding member 11a and the second holding member 11b includes a band 13 and reinforcing plates 12 arranged at both ends of the band 13.

As shown in FIG. 1, the reinforcing plate 12 is, for example, a metal plate having a predetermined width. The width of the reinforcing plate 12 is substantially equal to the width of the band 13. As shown in FIGS. 3 and 4, the reinforcing plate 12 overlaps the end of the band 13 to press the end of the band 13 from an outer side of the band 13 (upper or lower side of the band 13 in FIGS. 3 and 4). An end 12c of the reinforcing plate 12 closer to the hydrogen tank 1 has an arc shape to warp outward in conformity with the curved shape of the band 13. Thus, it is possible to attain an effect of suppressing interference of the end 12c of the reinforcing plate 12 with the band 13 to suppress the end 12c from damaging the band 13.

As shown in FIG. 4, the reinforcing plate 12 has a relatively small through hole 12a and a relatively large through hole 12b. The fastening member 30 for fastening the first holding member 11a and the second holding member 11b is inserted through the through hole 12a. The fastening member 30 includes, for example, a bolt and a nut. A bolt 6 for fixing the tank holding device 10 to, for example, a vehicle body structural member 5 is inserted through the through hole 12b. The through hole 12b is positioned closer to the hydrogen tank 1 as compared with the through hole 12a. Examples of the vehicle body structural member 5 include a side member and a floor panel of the fuel cell electric vehicle.

The band 13 is a member for tightening the hydrogen tank 1. The band 13 has a leaf spring structure to hold the hydrogen tank 1 and to follow expansion and contraction of the hydrogen tank 1 (in particular, expansion and contraction in a radial direction of the hydrogen tank 1). The band 13 includes a band-shaped base portion 14 and a plurality of pressing portions 15 projecting from both sides of the base portion 14 (right and left sides of the base portion 14 in FIG. 1) in a width direction of the base portion 14. The width direction of the base portion 14 is a direction orthogonal to a longitudinal direction of the base portion 14.

The base portion 14 extends along the outer circumference of the hydrogen tank 1, and includes wide portions and a narrow portion. The width of the wide portion is relatively large. The width of the narrow portion is relatively small. The wide portion is positioned at each end of the base portion 14 in the longitudinal direction and overlaps the reinforcing plate 12. The narrow portion is positioned between the wide portions and extends along the outer peripheral surface of the hydrogen tank 1 when the band 13 holds the hydrogen tank 1. Although illustration is omitted, the wide portion of the base portion 14 has through holes extending through the wide portion at positions mated with the through holes 12a and 12b of the reinforcing plate 12, respectively.

Figure 5:
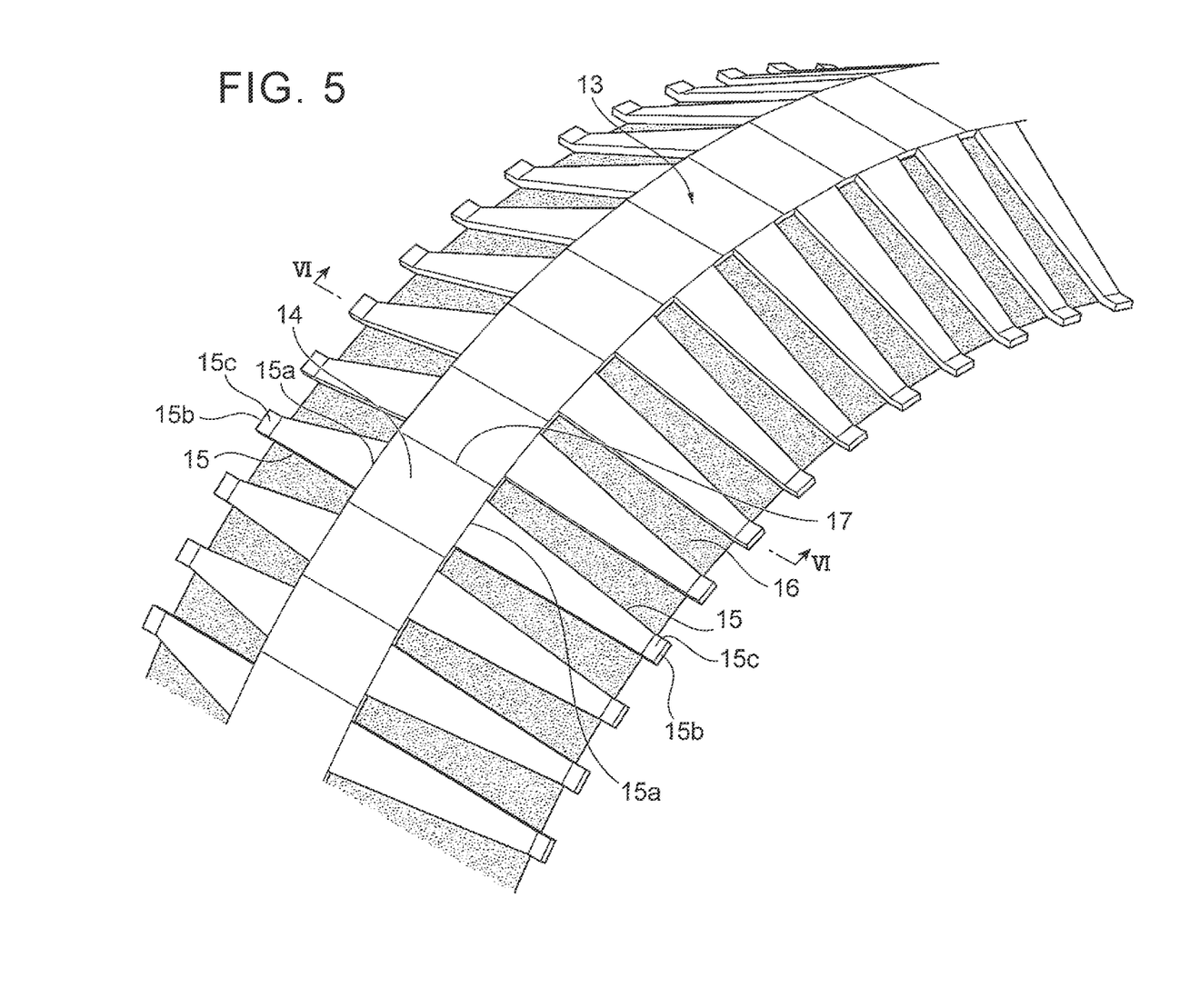
FIG. 5 is a partial perspective view showing a band and an elastic member.
Figure 6:
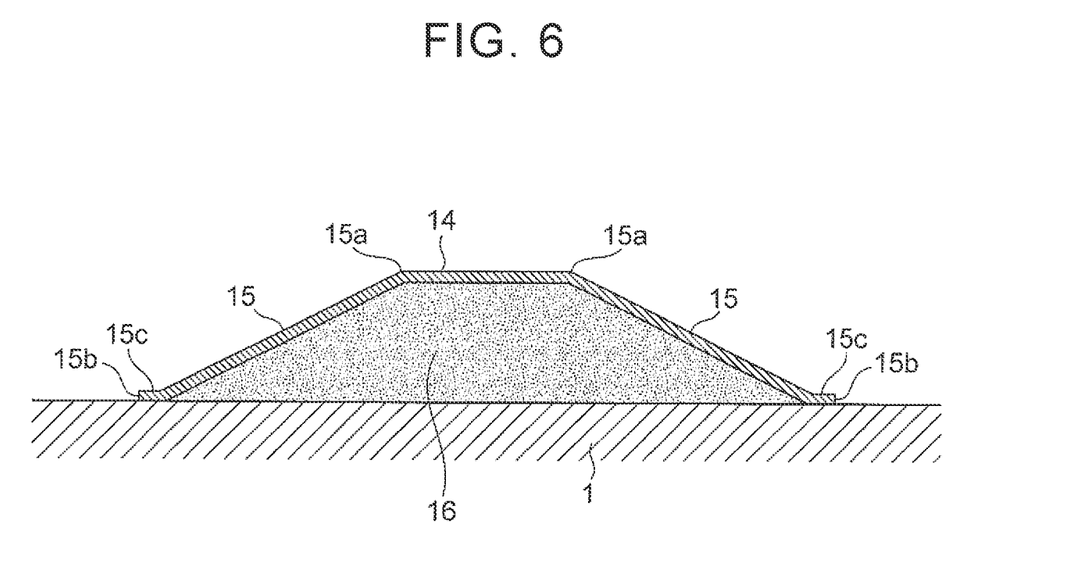
FIG. 6 is a sectional view taken along a line VI-VI in FIG. 5.

FIG. 5 is a partial perspective view showing the band and an elastic member. FIG. 6 is a sectional view taken along a line VI-VI in FIG. 5. FIG. 5 shows the plurality of pressing portions 15. The pressing portions 15 extend from the narrow portion of the base portion 14 to the right and left sides. These pressing portions 15 are bilaterally symmetrical across the base portion 14 and are arranged at equal intervals in the longitudinal direction of the base portion 14. The pressing portion 15 can apply a pressing force to the outer peripheral surface of the hydrogen tank 1 by elastically deforming in abutment against the outer peripheral surface of the hydrogen tank 1.

Specifically, the pressing portions 15 arranged on the right and left sides of the base portion 14 are bent obliquely downward from the base portion 14 (that is, toward the hydrogen tank 1). As shown in FIGS. 5 and 6, the pressing portion 15 positioned on the left side of the base portion 14 is bent obliquely downward to the left, and the pressing portion 15 positioned on the right side of the base portion 14 is bent obliquely downward to the right. A pair of right and left pressing portions 15 and a part of the base portion 14 that couples the right and left pressing portions 15 constitute one leaf spring.

The pressing portion 15 has the same thickness as that of the base portion 14. The pressing portion 15 is formed so that the width gradually decreases from a root portion 15a toward a tip portion 15b. The root portion 15a is coupled to the base portion 14. The tip portion 15b includes a free end. A part of the tip portion 15b includes a tab 15c parallel to the outer peripheral surface of the hydrogen tank 1. By forming the tab 15c parallel to the outer peripheral surface of the hydrogen tank 1 on the part of the tip portion 15b, a large abutment area can be secured between the pressing portion 15 and the outer peripheral surface of the hydrogen tank 1. As a result, an effect of suppressing the damage to the outer peripheral surface of the hydrogen tank 1 due to the pressing portion 15 can be expected.

As shown in FIG. 5, the base portion 14 includes a plurality of ridge portions 17. These ridge portions 17 further fit the band 13 to the outer peripheral surface of the hydrogen tank 1. The ridge portions 17 are formed by bending the base portion 14 little by little at predetermined intervals in conformity with the curvature of the outer peripheral surface of the hydrogen tank 1. Assuming that the right and left pressing portions 15 and the part of the base portion 14 that couples the right and left pressing portions 15 constitute one leaf spring, each ridge portion 17 is formed between adjacent leaf springs.

The band 13 is formed by, for example, punching a single stainless steel sheet into a shape including the base portion 14 and the pressing portions 15 and then bending the band 13 at predetermined positions. The material used for the band 13 is not limited to the stainless steel, and may be another metal material excellent in strength and elastic deformation.

When the hydrogen tank 1 is tightened by using the band 13 having such a leaf spring structure, as shown in FIG. 6, the tab 15c of each pressing portion 15 abuts against the outer peripheral surface of the hydrogen tank 1, and the base portion 14 floats above the outer peripheral surface of the hydrogen tank 1. That is, the tab 15c of the pressing portion 15 comes into contact with the outer peripheral surface of the hydrogen tank 1. Since the base portion 14 is supported by the pressing portions 15, the base portion 14 floats above the outer peripheral surface of the hydrogen tank 1 without coming into contact with the outer peripheral surface of the hydrogen tank 1.

When the first holding member 11a and the second holding member 11b are tightened by the fastening members 30, the band 13 having the leaf spring structure is elastically deformed. As a result, the pressing portions 15 apply pressing forces to the outer peripheral surface of the hydrogen tank 1. When the band 13 is elastically deformed, the elastic deformation of each pressing portion 15 is larger than that of the base portion 14.

As shown in FIG. 6, the other part of the band 13 excluding the tabs 15c of the pressing portions 15 floats above the outer peripheral surface of the hydrogen tank 1 without coming into contact with the outer peripheral surface of the hydrogen tank 1. Therefore, a gap is present between the band 13 and the hydrogen tank 1. In the first embodiment, in order to suppress entry of a foreign substance, an elastic member 16 is provided in the gap between the band 13 and the hydrogen tank 1 to fill the gap.

The elastic member 16 has a trapezoidal sectional shape to fit in the gap between the band 13 and the hydrogen tank 1 (see FIG. 6). The elastic member 16 is integrally formed from one end to the other end of the narrow portion of the band 13 (see FIGS. 1 and 3). The elastic member 16 is fitted in the gap between the band 13 and the hydrogen tank 1. The elastic member 16 may be a closed cell foam, or may be made of closed cell urethane.

Figure 7:
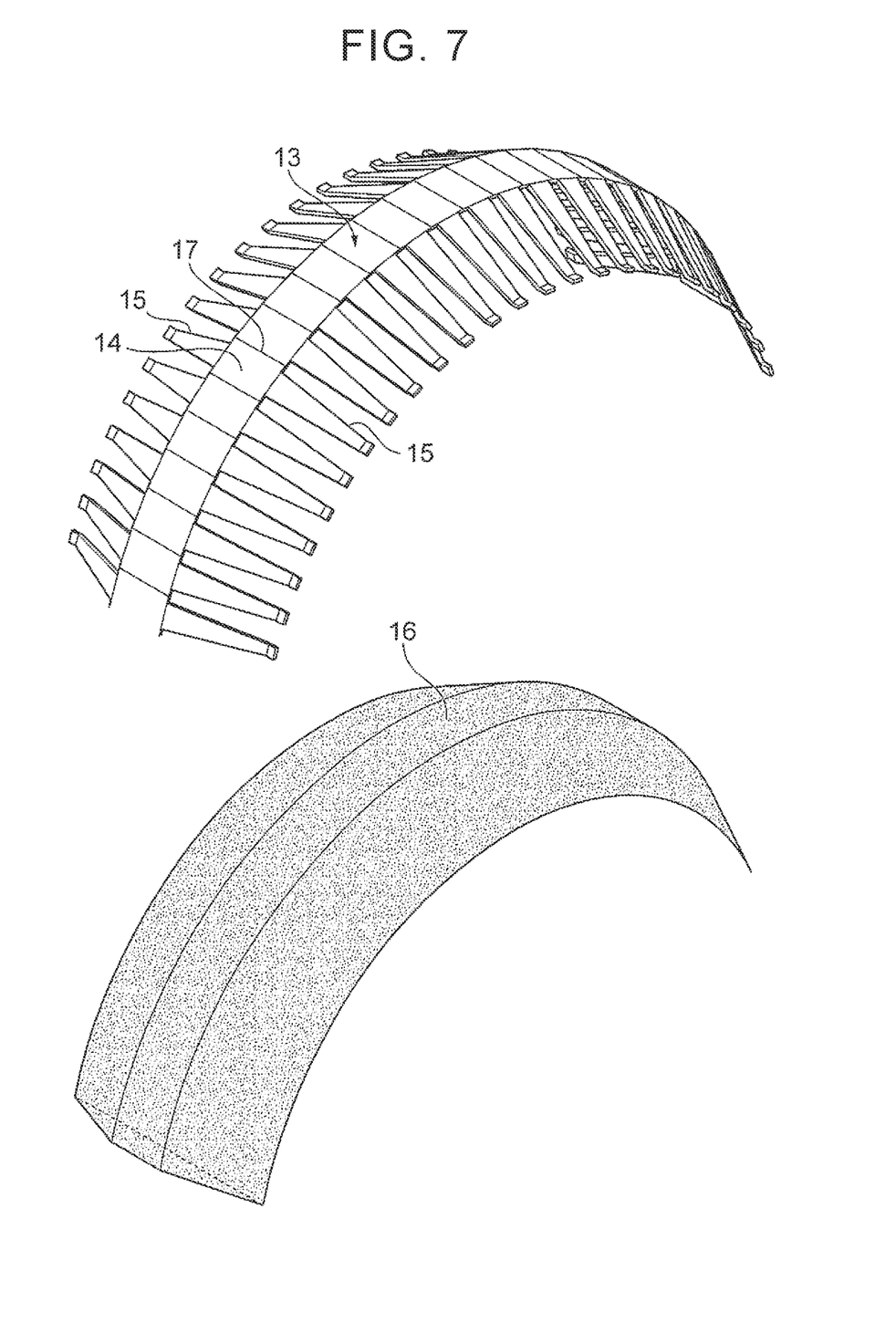
FIG. 7 is an exploded perspective view showing the band and the elastic member.

As shown in FIG. 7, the elastic member 16 is produced to have a predetermined curvature in conformity with the curved shape of the band 13. The elastic member 16 is attached to the back surface of the band 13 (that is, the surface facing the hydrogen tank 1) by bonding or the like.

In the tank holding device 10 structured as described above, the elastic member 16 is provided in the gap between the band 13 and the hydrogen tank 1 to fill the gap. The elastic member 16 can be used to suppress the entry of a foreign substance into the gap between the band 13 and the hydrogen tank 1. Since the elastic member 16 fills the gap, it is possible to suppress influence of arrangement of the elastic member 16 on the elastic deformation of the pressing portions 15.

The elastic member 16 is made of the closed cell urethane. The closed cell urethane has a property that liquid hardly enters the inside. Therefore, the closed cell urethane can suppress not only a solid foreign substance but also a liquid foreign substance such as muddy water from entering the gap between the band 13 and the hydrogen tank 1. The closed cell urethane is relatively inexpensive and has high stretchability. By using the closed cell urethane for the elastic member 16, it is possible to suppress the influence of the arrangement of the elastic member 16 on the elastic deformation of the pressing portions 15. By using the closed cell urethane for the elastic member 16, it is possible to suppress an increase in cost along with the arrangement of the elastic member 16.

The tank holding device of the first embodiment is not limited to the device described above, and various modifications may be conceivable. For example, the elastic member 16 may be a closed cell foam other than the closed cell urethane.

Second Embodiment

In a tank holding device 10 of a second embodiment, the elastic member 16 has a function of limiting excessive deformation of the pressing portions 15 in addition to the function of suppressing the entry of a foreign substance as described above. In this respect, the second embodiment differs from the first embodiment. The difference will mainly be described below.

For example, when a protrusion on a road surface where the vehicle travels interferes with the vehicle to generate a large vibration or a large impact is input to the vehicle, a large stress may be applied to the band 13 having the leaf spring structure. When the pressing portion 15 of the band 13 is excessively deformed due to the stress, the deformation of the leaf spring may exceed an elastic region and reach a plastic region. To suppress this situation, in the second embodiment, a relatively hard material such as urethane rubber is selected as the material of the elastic member 16 to limit the excessive deformation of the pressing portion 15.

According to the tank holding device 10 of the second embodiment, the same actions and effects as those in the first embodiment can be attained. In the tank holding device 10 of the second embodiment, the elastic member 16 has the function of limiting the excessive deformation of the pressing portions 15. Therefore, it is possible to suppress irreversible deformation of the band 13 by limiting the excessive deformation of the pressing portions 15. For example, a material that can limit deformation of the pressing portions 15 to a specified amount may be selected as the material of the elastic member 16. A material with which the pressing portions 15 can be used in the elastic region may be selected as the material of the elastic member 16.

Third Embodiment

In a tank holding device 10 of a third embodiment, the elastic member 16 has the function of limiting the excessive deformation of the pressing portions 15 in addition to the function of suppressing the entry of a foreign substance as described above. In this respect, the third embodiment differs from the first embodiment. The difference will mainly be described below.

Figure 8:
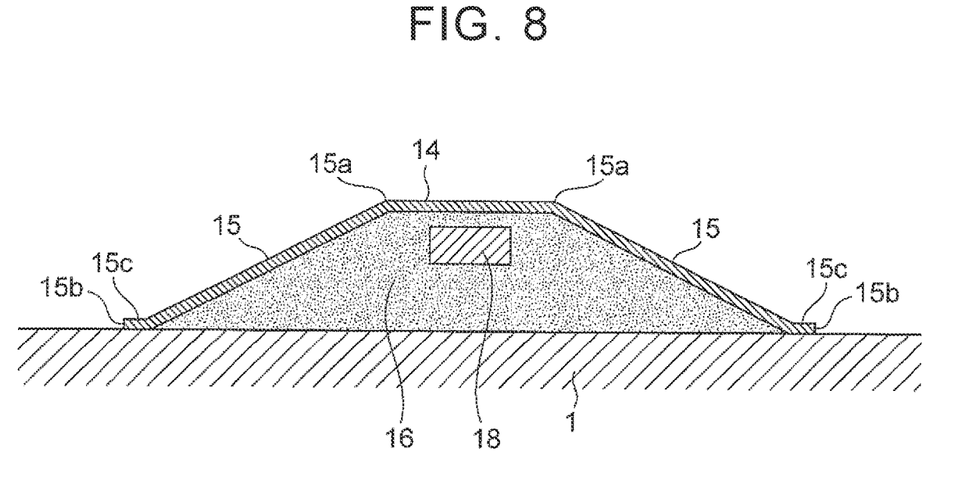
FIG. 8 is a sectional view showing a holding member of a tank holding device according to a third embodiment.

Specifically, as shown in FIG. 8, a metal member 18 is provided inside the elastic member 16. Examples of the material of the metal member 18 include aluminum and iron. The metal member 18 may be elongated to have the same length as that of the elastic member 16 and inserted into the elastic member 16. The metal member 18 may be formed in a shape of blocks to be embedded inside the elastic member 16 at predetermined intervals. The arrangement position and thickness of the metal member 18 in the elastic member 16 may be set as appropriate to limit the deformation of the pressing portions 15 to the specified amount, in particular, to use the pressing portions 15 in the elastic region.

According to the tank holding device 10 of the third embodiment, the same actions and effects as those in the first embodiment can be attained. In the tank holding device 10 of the third embodiment, the deformation of the pressing portions 15 to the specified amount can be limited by using the metal member 18 provided inside the elastic member 16. Therefore, the irreversible deformation of the band 13 can be suppressed even if a large stress is applied to the band 13 due to vibration, impact, or the like.

In the third embodiment, a hard resin member may be provided inside the elastic member 16 instead of the metal member 18. Examples of the hard resin member include a polypropylene resin, a polycarbonate, and an acrylonitrile butadiene styrene (ABS) resin.

Fourth Embodiment

A tank holding device 10 of a fourth embodiment differs from the tank holding device 10 of the first embodiment in that a slide plate 19 is interposed between the band 13 and the hydrogen tank 1. The difference will mainly be described below.

Figure 9:
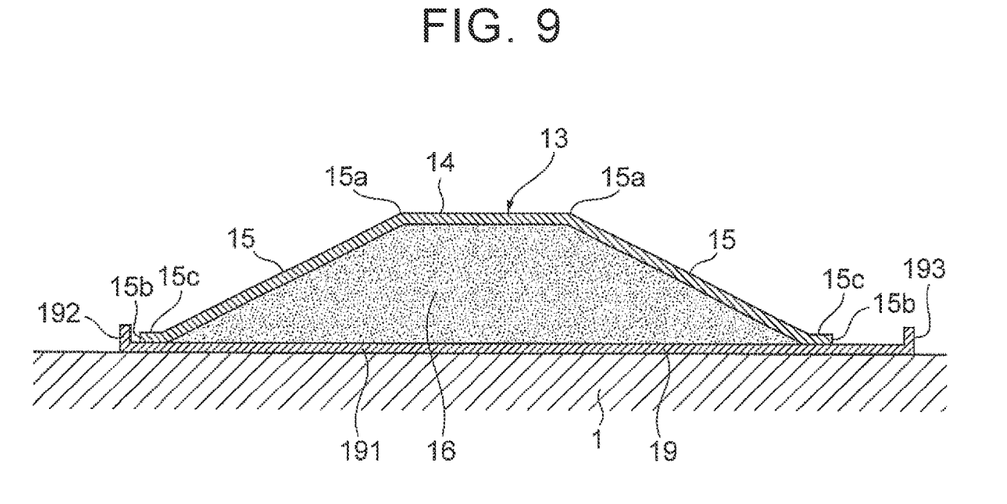
FIG. 9 is a sectional view showing a holding member of a tank holding device according to a fourth embodiment.

Specifically, as shown in FIG. 9, the band 13 abuts against the outer peripheral surface of the hydrogen tank 1 via the slide plate 19. When the hydrogen tank 1 is filled with and discharges hydrogen gas repeatedly, the hydrogen tank 1 expands and contracts repeatedly not only in the radial direction of the hydrogen tank 1 but also in the direction of the axis L of the hydrogen tank 1. In particular, the amounts of expansion and contraction of the hydrogen tank 1 increase as the hydrogen tank 1 is longer and thinner. Along with the expansion and contraction of the hydrogen tank 1, the elastic deformation amount of the band 13 having the leaf spring structure in the tank holding device 10 increases and decreases. As a result, the slide amount of the band 13 increases. The slide plate 19 is interposed between the band 13 and the outer peripheral surface of the hydrogen tank 1 to reduce a frictional resistance during a slide of the band 13 and to suppress positional misalignment due to the slide of the band 13.

As shown in FIG. 9, the slide plate 19 includes a body 191, a left standing portion 192, and a right standing portion 193. The body 191 extends along the outer peripheral surface of the hydrogen tank 1. The left standing portion 192 stands at the left end of the body 191. The right standing portion 193 stands at the right end of the body 191. The distance between the left standing portion 192 and the right standing portion 193 (that is, the width of the body 191) is set in consideration of a slide allowance of the band 13 to follow the expansion and contraction of the hydrogen tank 1. For example, the distance between the left standing portion 192 and the right standing portion 193 is set slightly larger than a maximum slide amount of the band 13 when the hydrogen tank 1 is full (that is, the hydrogen tank 1 expands maximally). The slide plate 19 is made of, for example, a metal material or a resin material.

According to the tank holding device 10 of the fourth embodiment, the same actions and effects as those in the first embodiment can be attained. In the tank holding device 10 of the fourth embodiment, the slide plate 19 is interposed between the band 13 and the hydrogen tank 1. Therefore, the frictional resistance during the slide of the band 13 can be reduced. Further, the positional misalignment due to the slide of the band 13 can reliably be suppressed by limiting the slide range of the band 13 with the left standing portion 192 and the right standing portion 193.

While the embodiments of the present disclosure have been discussed in detail above, the present disclosure is not limited to the embodiments discussed above, and a variety of design changes can be made without departing from the scope of the present disclosure.

What is claimed is:

1. A tank holding device comprising:
  a band configured to tighten a tank, wherein the band includes
    a band-shaped base portion extending along an outer circumference of the tank, and
    a plurality of pressing portions projecting from both sides of the band-shaped base portion in a width direction orthogonal to a longitudinal direction of the band-shaped base portion and configured to apply a pressing force to an outer peripheral surface of the tank by elastically deforming in abutment against a slide plate; and
  at least an elastic member provided in a gap between the band and the tank to fill the gap, wherein
- the slide plate is interposed between each of the pressing portions and the outer peripheral surface of the tank, and
- the slide plate includes a body extending along the outer peripheral surface of the tank, and a left standing portion and a right standing portion standing at both ends of the body in the width direction orthogonal to the longitudinal direction.

2. The tank holding device according to claim 1, wherein the elastic member is a closed cell foam.

3. The tank holding device according to claim 1, wherein the elastic member is made of urethane.

4. The tank holding device according to claim 1, wherein the elastic member is configured to limit deformation of the pressing portions to a specified amount.

5. The tank holding device according to claim 1, wherein a metal member is provided inside the elastic member.

6. The tank holding device according to claim 1, wherein a hard resin member is provided inside the elastic member.

* * * * *